(12) United States Patent
Fuller et al.

(10) Patent No.: US 8,441,452 B1
(45) Date of Patent: May 14, 2013

(54) MULTIPLE TOUCH DETECTION

(75) Inventors: Thomas Fuller, Seattle, WA (US); Jon Peterson, Palo Alto, CA (US); Ted Tsui, Mountlake Terrace, WA (US); Seok Pyong Park (Tony Park), Everett, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 553 days.

(21) Appl. No.: 12/422,226

(22) Filed: Apr. 10, 2009

Related U.S. Application Data

(60) Provisional application No. 61/044,008, filed on Apr. 10, 2008, provisional application No. 61/057,864, filed on Jun. 1, 2008.

(51) Int. Cl.
*G06F 3/045* (2006.01)

(52) U.S. Cl.
USPC .......................................... 345/173; 345/174

(58) Field of Classification Search ........................ None
See application file for complete search history.

(56) References Cited

U.S. PATENT DOCUMENTS

| | | | |
|---|---|---|---|
| 4,293,734 A | 10/1981 | Pepper, Jr. | |
| 4,736,191 A | 4/1988 | Matzke et al. | |
| 5,303,017 A | 4/1994 | Gerpheide | |
| 5,543,590 A | 8/1996 | Gillespie et al. | |
| 5,543,591 A | 8/1996 | Gillespie et al. | |
| 5,748,185 A | 5/1998 | Stephan et al. | |
| 5,825,352 A | 10/1998 | Bisset et al. | |
| 5,943,052 A | 8/1999 | Allen et al. | |
| 6,028,271 A | 2/2000 | Gillespie et al. | |
| 6,037,929 A | 3/2000 | Ogura et al. | |
| 6,086,391 A | 7/2000 | Seely et al. | |
| 6,262,717 B1 | 7/2001 | Donohue et al. | |
| 6,380,931 B1 | 4/2002 | Gillespie et al. | |
| 6,414,671 B1 | 7/2002 | Gillespie et al. | |
| 6,621,487 B2 | 9/2003 | Iwasaki et al. | |
| 6,704,005 B2 | 3/2004 | Kato et al. | |
| 6,825,890 B2 | 11/2004 | Matsufusa | |
| 7,030,860 B1 | 4/2006 | Hsu et al. | |
| 7,982,717 B2 * | 7/2011 | Chien et al. ................... | 345/173 |
| 8,089,470 B1 | 1/2012 | Schediwy et al. | |
| 2003/0206162 A1 | 11/2003 | Roberts | |
| 2006/0066582 A1 | 3/2006 | Lyon et al. | |
| 2006/0097991 A1 | 5/2006 | Hotelling et al. | |
| 2008/0150906 A1 | 6/2008 | Grivna | |
| 2009/0167725 A1 * | 7/2009 | Lee et al. ...................... | 345/178 |
| 2009/0237362 A1 * | 9/2009 | Wu et al. ....................... | 345/173 |

FOREIGN PATENT DOCUMENTS

WO  PCTSE2004001447  3/2007

OTHER PUBLICATIONS

"CSD User Module Data Sheet," CSD v1.0; Oct. 23, 2006; 58 pages.
U.S. Appl. No. 11/731,893 dated Mar. 29, 2007; 65 pages.
U.S. Appl. No. 12/455,413 "Multiple touch detection," Seok-Pyong Park et al., Filed on Jun. 1, 2009; 42 pages.
Cypress Semiconductor Corporation, "CY8C21x34 Data Sheet," CSR User Module, CSR V.1,0; Oct. 6, 2005; 36 pages.
Dave Van Ess, "Understanding Switched Capacitor Analog Blocks," Application Note AN2041, Mar. 30, 2004; 16 pages.

(Continued)

*Primary Examiner* — Joseph Haley

(57) ABSTRACT

An apparatus for and method of detecting multiple presences on a touch sensor device are described.

21 Claims, 10 Drawing Sheets

OTHER PUBLICATIONS

Dennis Seguine, "Capacitive Switch Scan," AN2233a., Application Note, CY8C21x:34, Apr. 7, 2005; 6 pages.
Mark Lee, "CapSense Best Practices," Cypress Semiconductor Application Note, Oct. 16, 2006; 10 pages.
Ryan Seguine et al. "Layout Guidelines for PSoC CapSense", Cypress Application Note AN2292, Revision B, Oct. 31.2005; all pages.
USPTO Final Rejection for U.S. Appl. No. 12/455,413 dated Sep. 5, 2012; 8 pages.
Wayne Westerman; "Hand Tracking, Finger Identification, and Chordic Manipulation on a Multi-Touch Surface"; dated Spring 1999; 363 pages.
U.S. Appl. No. 61/044,008 "Method for Detecting Multiple Simultaneous Touches on a Touchscreen," Thomas Fuller et al., Filed on Apr. 10, 2008; 13 pages.
U.S. Appl. No. 61/057,864 "Single and Multi Touch Detection System and Method," Tony Park et al., Filed on Jun. 1, 2008; 9 pages.
USPTO Advisory Action for U.S. Appl. No. 12/455,413 dated Nov. 5, 2012; 4 pages.
USPTO Advisory Action for U.S. Appl. No. 12/455,413 dated Dec. 13, 2012; 3 pages.

* cited by examiner

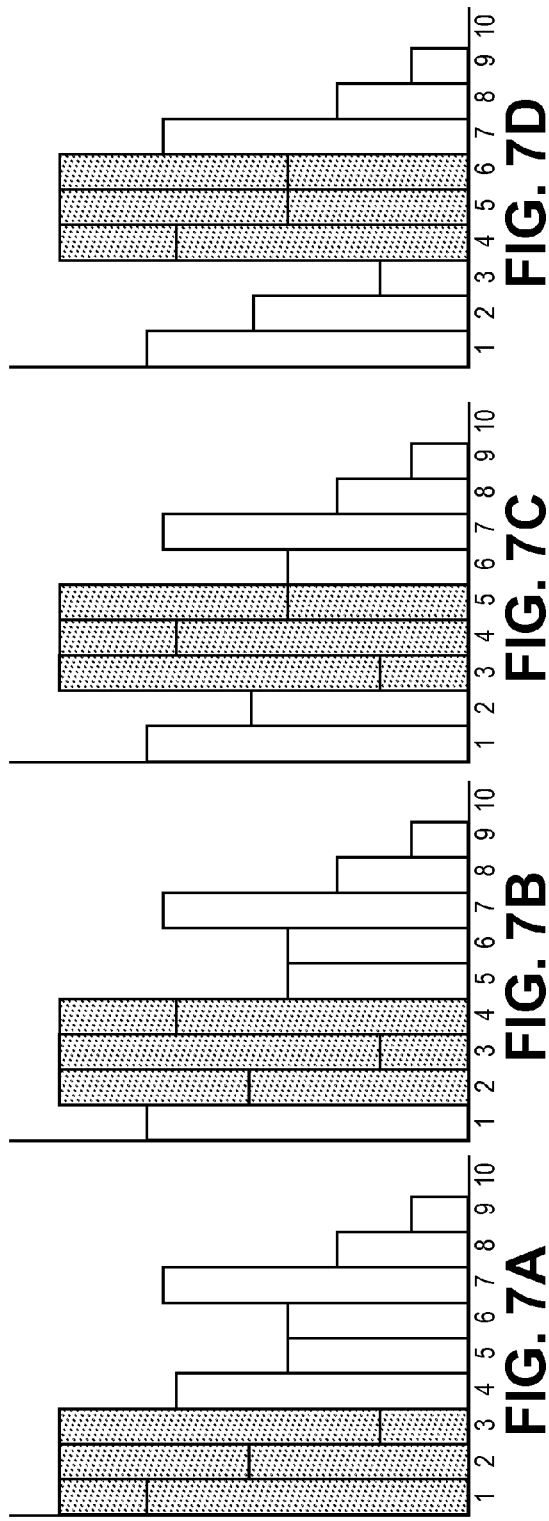
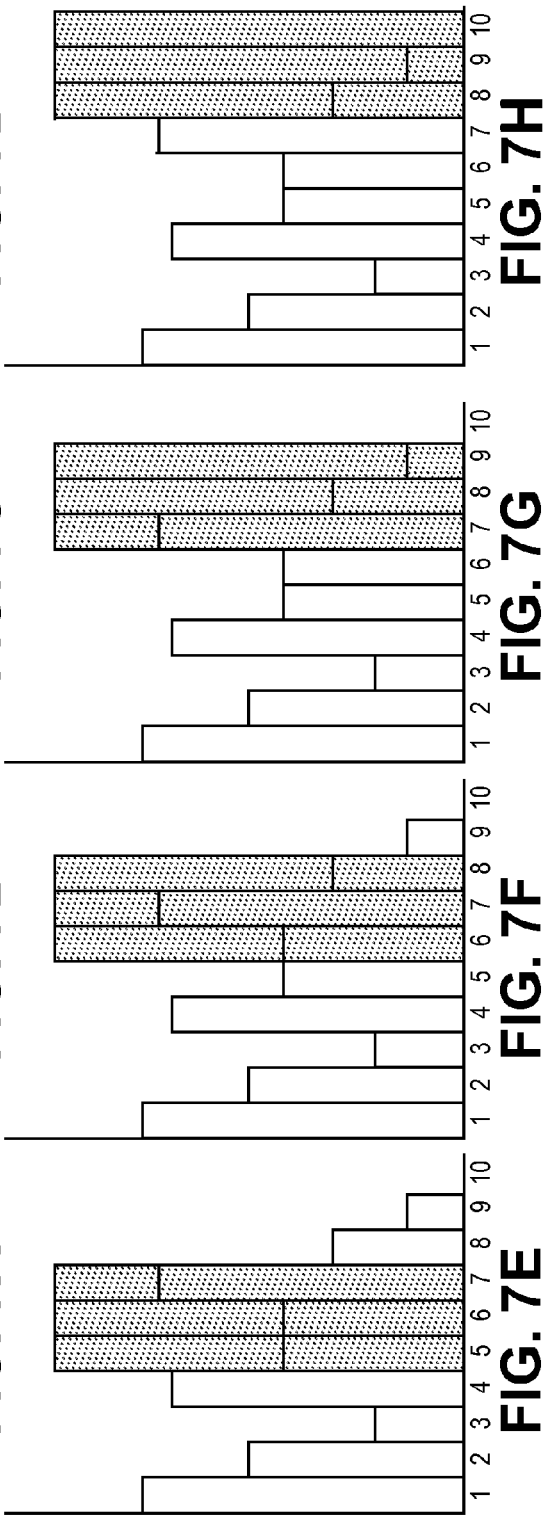

MULTIPLE TOUCH DETECTION

REFERENCE TO RELATED APPLICATION

This application claims the benefit of U.S. Provisional Application No. 61/044,008, filed Apr. 10, 2008 and U.S. Provisional Application No. 61/057,864, filed Jun. 1, 2008.

TECHNICAL FIELD

The present disclosure relates generally to touch sensor devices and, more particularly, to resolving multiple touches on a multiple touch sensor device.

BACKGROUND

One type of touch sensor device operates by way of capacitance sensing utilizing capacitance sensors. The capacitance detected by a capacitance sensor changes as a function of the proximity of a conductive object to the sensor. The conductive object can be, for example, a stylus or a user's finger. In a touch sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch sensor pad or touch sensor screen in the X and Y dimensions. A touch sensor strip, slider, or button operates on the same capacitance-sensing principle.

One type of touch sensor device is composed of a matrix of rows and columns. Within each row or column, there are multiple sensor elements. However, all sensor pads within each row or column are coupled together and operate as one long sensor element. The number of touches a touchpad can detect is not the same as the resolution of the touchpad. For example, even though a touchpad may have the capability to detect two substantially simultaneous touches with an XY matrix, such touchpads cannot resolve the location of the two substantially simultaneous touches. One way to resolve the location of a second touch is if the touches arrive sequentially in time. This allows the remaining three potential locations to be evaluated to determine which locations are "actual touch" locations and which are invalid touches, also referred to as "ghost touch" locations. If both touches arrive or are detected substantially simultaneously, there is no way to resolve which of the two pairs of potential locations constitute "actual" touches, instead of invalid touches (e.g., "ghost" touches). Thus, such two-axis touchpads are configured to resolve only a location of a single touch. Similarly, current touch screens are designed to detect the presence and location of a single touch.

Touch pads that detect multiple touches may use a counting technology which iterates through the sensors, examining the signals caused by the detected capacitance. When a non-zero data value following a zero (inactive sensor) is encountered, it marks that sensor as the start of a conductive object. The system continues iterating and increments the size of the conductive object until another inactive sensor is found, indicating the end of the conductive object. An inactive sensor must be present between conductive objects in order to detect two touches. However, if two fingers are placed close together on the slider, they will appear as only one touch, since there are no inactive sensors between the fingers.

BRIEF DESCRIPTION OF THE DRAWINGS

Embodiments are illustrated by way of example and not intended to be limited by the figures of the accompanying drawings in which like references indicate similar elements and in which:

FIGS. 7A-7H illustrate a sensor window as it shifts through a number of sensor elements to determine whether a conductive object is present according an embodiment.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description. Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. It should be noted that although embodiments may be described in regards to a "finger" touch, the term "touch" as used herein refers to the presence (i.e., in contact or close enough proximity for detection) of a conductive object (such as a finger or conductive stylus).

A method of resolving multiple touches from data received from a multi-touch sensor device is described. In one embodiment, a peak detection method is used that evaluates the touch sensor element signals of a group of two or more sensor elements for peaks. The touch sensor element locations of the peaks may be stored and the number of touches may be calculated with sensor element signal data of some number of sensor elements (which in one embodiment may be defined during tuning of the touch sensor device) surrounding the peaks. In one embodiment, the number of sensors surrounding the peaks that are used in the multi-touch calculations may be determined based on the sensor device layout. In another embodiment, the group of two or more sensor elements may be evaluated for a rising slope, which is interpreted as the presence of a conductive object.

The peaks and slope correspond to the difference in count values, between a stored value for no sensor element activation and an acquired value with sensor element activation, for each of the sensor elements of a touch sensor array that are scanned. The counts are directly proportional to the sensed signal (e.g., capacitance) for a sensor element. Active elements within each peak are then used to determine multiple touches. The active elements are the sensors elements that are determined to have a difference count above a presence threshold value.

Figure 1A:
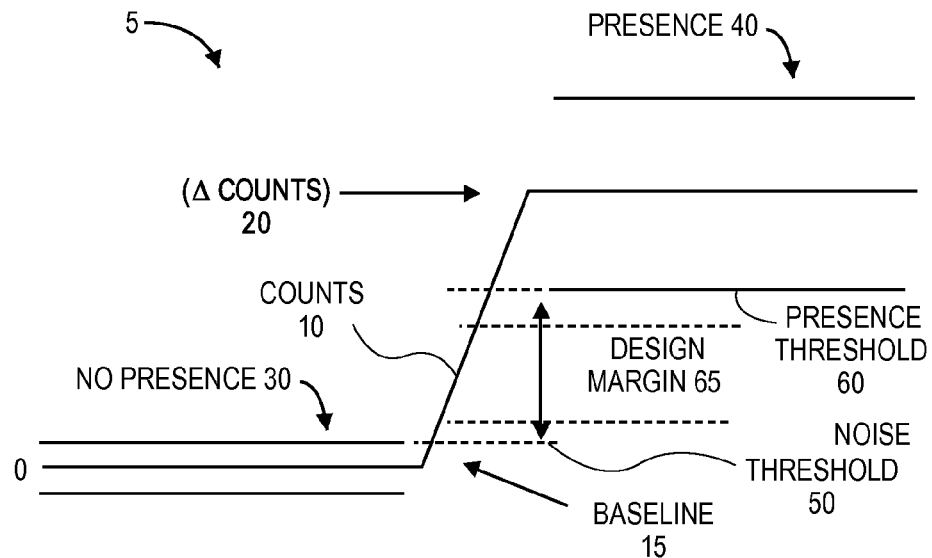
FIG. 1A illustrates a graph of a difference count of a single sensor element according to an embodiment.
Figure 2A:
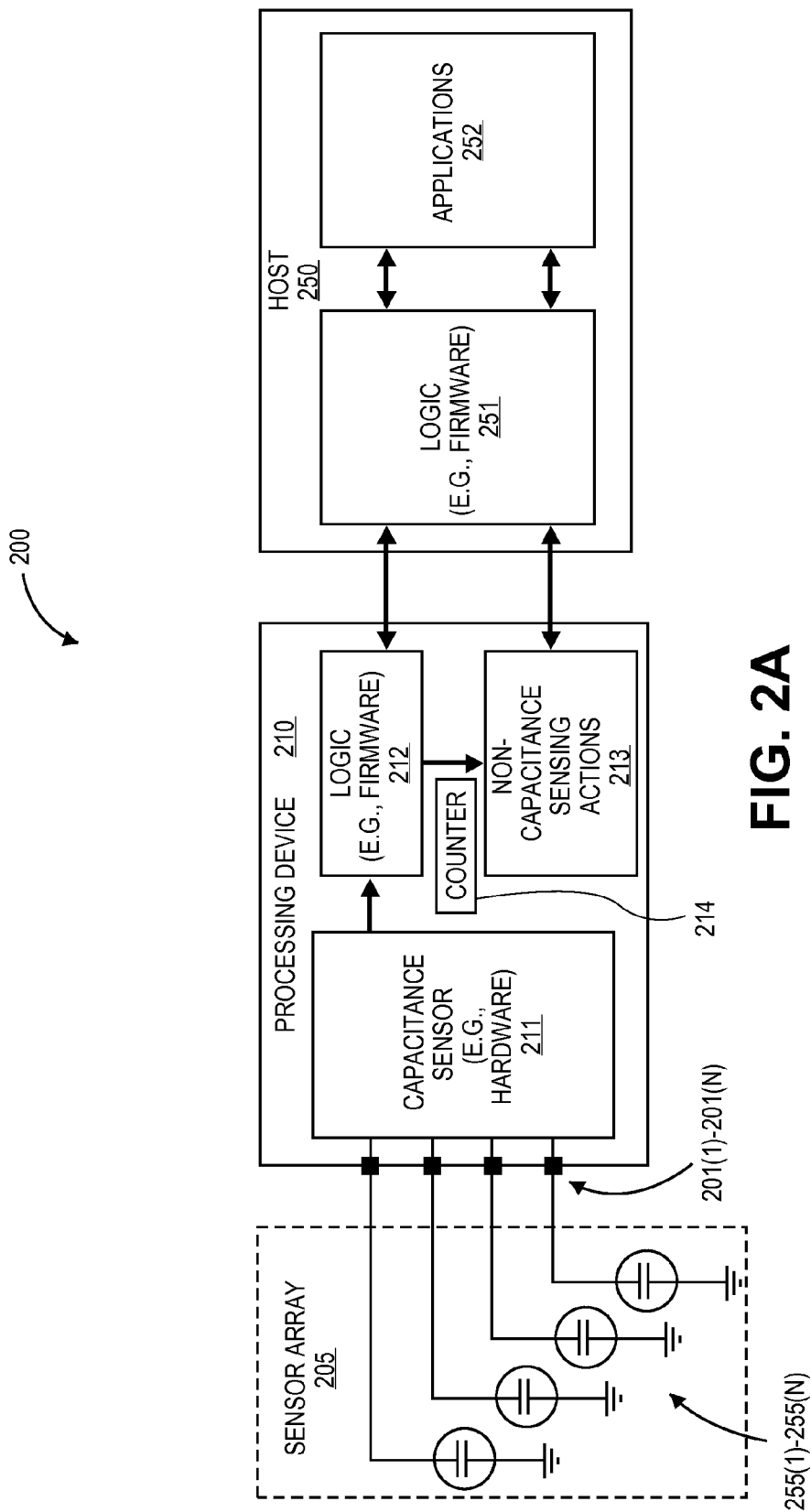
FIG. 2A illustrates a block diagram of one embodiment of an electronic device having a touch sensor device and a processing device that includes a capacitance sensor for measuring the capacitance on a sensor array and logic implementing embodiments.

FIG. 1A illustrates a graph 5 of a difference count of a single sensor element. At startup (or boot) of a touch sensor array, the sensor elements 255(1)-255(N) (N is a positive integer value that represents the number of sensor elements, where N is equal to four in the figures, but may be less or more than four) of a touch sensor array 205, as illustrated in FIG. 2A, are scanned and the count values for each sensor element with no activation are stored as a baseline 15. The presence of a finger or conductive object on a sensor element is determined by the difference in counts between a stored value for no sensor element activation and an acquired value with sensor element activation, referred to as a difference count (Δ Counts) 20.

Graph 5 includes the counts 10 as measured on a single sensor element for "no presence" 30 on the sensor element, and for "presence" 40 on the sensor element. "No presence" 30 is when the sensing device does not detect the presence of the conductive object, such as a finger. "No presence" 30 may be configured to be detected below a noise threshold 50. So long as the counts 10 are measured as being below noise threshold 50, the sensing device detects "no presence". "Presence" 40 is when the sensing device detects the presence of the conductive object (e.g., finger) on the sensor element. In one embodiment, presence 40 is detected when the counts 10 are greater than noise threshold 50. In another embodiment, presence 40 is detected when the counts 10 are greater than a presence threshold 60. The presence threshold may be used to include a design margin 65 in determining that a presence of a conductive object is detected on the sensing element.

Figure 1B:
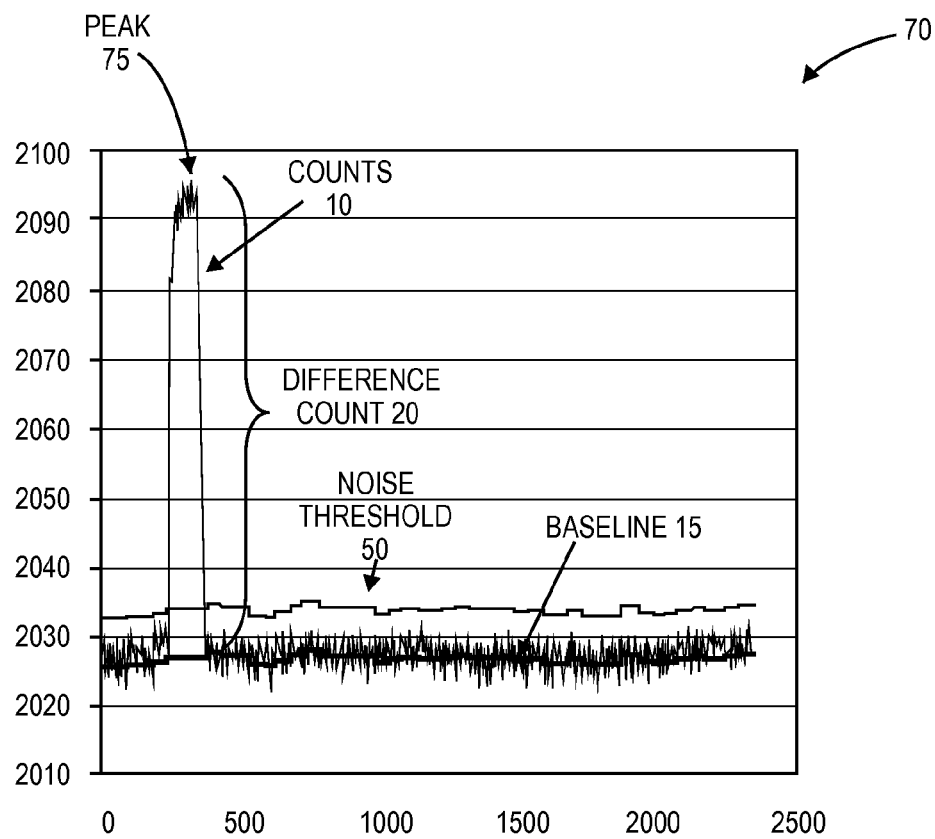
FIG. 1B illustrates a graph of capacitance measured on a single sensor element according to an embodiment.

FIG. 1B illustrates a graph of peak capacitance measured on a single sensor element. The graph 70 illustrates the measured capacitance as counts 10, as well as the baseline 15. A baseline 15, or reference, may be tracked so the processing device 210 of FIG. 2A knows when the user interaction is present (e.g., finger on sensor element) by comparing the counts 10 (representing the capacitance due to the presence of a conductive object, such as user's finger) with the baseline 15. The baseline counts 15 are the counts that normally occur on a sensor without the presence of a conductive object. The difference counts 20 are counts that exceed the baseline threshold 15. A noise threshold count 50 may be set so that the processing device 210 can discriminate between noise and when the user interaction is present (e.g., finger on sensor element). For example, without the presence of a finger on a sensor, the baseline 15 may be 2030 counts. When a finger is present, the counts 10 go up to, for example, to (and thus the difference count 20 is 65) which is above noise threshold 50 and results in the peak 75 being detected by the peak detection algorithm that is used. It should be noted that the values provided in FIG. 1B are only for illustrative purposes. In alternative embodiments, other thresholds such as a negative noise threshold and a presence threshold 60 may be used.

FIG. 2A illustrates a block diagram of one embodiment of an electronic device 200 including a processing device that includes a capacitance sensor for measuring the capacitance on a sensor array and logic implementing embodiments of the present invention discussed herein. The electronic device 200 includes the sensor array 205, processing device 210, and host 250. The sensor array 205 may be a single set of sensor elements that are disposed in at least one dimension of the touch sensor device. The sensor array 205 is coupled to pins 201(1)-201(N) of the processing device 210. Each sensor element is represented as a capacitor. Sensor array 205 includes sensor elements 255(1)-255(N), where N is a positive integer value that represents the number of sensor elements of the sensor array 205. Although only four sensor elements are illustrated in FIG. 2, the set of sensor elements may include more or less sensor elements than four. In one embodiment, the capacitance sensor 211 may include a selection circuit (not illustrated). The selection circuit is coupled to the sensor elements 255(1)-255(N) and the sensing circuitry of the capacitance sensor 211. The selection circuit may be used to select which of the multiple sensor elements to provide the charge current and to measure the capacitance of each sensor element.

The processing device 210 further includes a logic block 212 to implement embodiments of the method described above. The operations of logic block 212 may be implemented in firmware; alternatively, it may be implemented in hardware or software. Processing device 210 may also include hardware or firmware for performing non-capacitance sensing actions 213. Additionally, processing device 210 may include a counter 214 which is incremented each time a conductive object is determined to be present on sensor array 205. In one embodiment the counter is implemented using firmware, however, in alternative embodiments a hardware counter may be used. Alternatively, instead of performing the operations of the logic 212 in the processing device 210, the processing device 210 may send the raw data to a host processing device 250 for operation by logic 251. The operations of logic 251 may also be implemented in firmware, hardware, and/or software. Embodiments of the method operations described herein may be implemented in logic 212, logic 251, applications 252, or in other hardware, software, and/or firmware in the processing device 210.

Various known circuitry may be used to implement capacitance sensor 211 for detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines as discussed above.

It should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art. A processing device having a capacitance sensor can be obtained from Cypress Semiconductor Corporation. Alternatively, processing devices having capacitance sensors may be obtained from other companies.

It should be noted that the sensor array 205 may be utilized in any one of various types of devices such as a touchpad, touch screen, touch sensor buttons, etc. Furthermore, the sensor array 205 may have any one of various different configurations, for example, a multiple dimension matrix, a single dimension linear slider, a radial slider, etc.

Figure 2B:
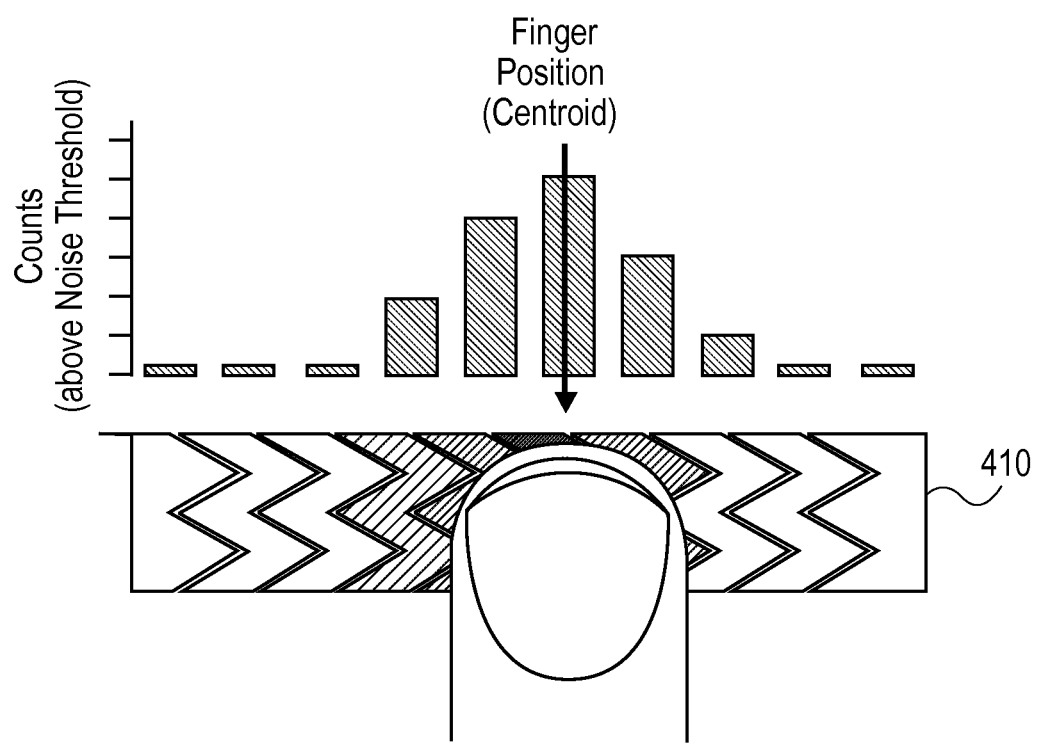
FIG. 2B illustrates a centroid algorithm for resolving the presence of a touch according to an embodiment.

FIG. 2B is a conceptual illustration of a centroid based finger position interpolation technique according to an embodiment. In order to calculate an interpolated position of a finger (on a touch sensor device such as a slider 410) using a centroid, the signal of a peak detected sensor element and those immediately adjacent may be used to compute a centroid:

$$\text{Centroid} = \frac{n_{i-1} \cdot (i-1) + n_i i + n_{i+1} \cdot (i+1)}{n_{i-1} + n_i i + n_{i+1}}$$

where n is a signal of a sensor element and i is the location of the strongest signal sensor element. In order to report the centroid to a specific resolution, for example a range of 0 to 100 (units relative to a desired resolution) for 12 sensor elements, the centroid value may be multiplied by a calculated or predetermined scalar. Alternatively, the interpolation and scaling operations may be combined into a single calculation and report this result directly in the desired scale. The above centroid algorithm may be used with each of the multiple peaks detected when two or more fingers are present on a touch sensor device as discussed below. Alternatively, other centroid algorithms may be used.

Figure 3A:
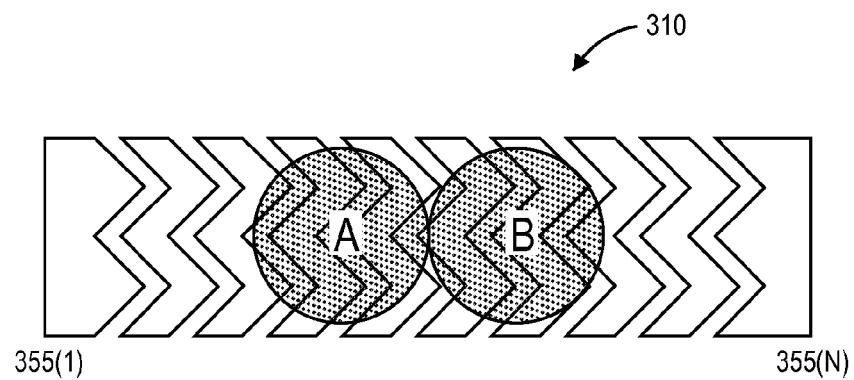
FIG. 3A illustrates the presence of two touches on a linear slider, according to an embodiment.

FIG. 3A illustrates the presence of two fingers on a linear slider, according to one embodiment of the present invention. In this example, two fingers (shown as circles A and B) are touching a sensor array which in the illustrated embodiment, is a linear slider. Each of the zagged strips represents a physical sensor (e.g., 355(1)-355(N)) in the touch sensor slider 310.

Figure 3B:
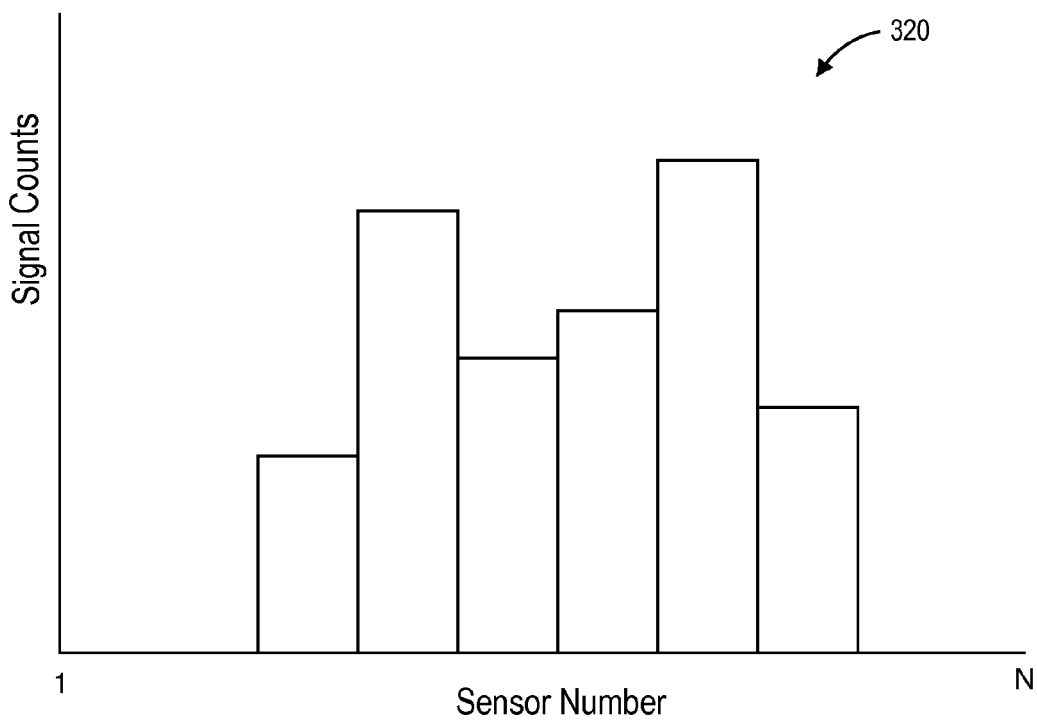
FIG. 3B illustrates is a chart illustrating the capacitance values sensed by the sensor elements of a linear slider according to an embodiment

FIG. 3B is a chart illustrating the capacitance values sensed by sensor elements 355(1)-355(N) of the slider 310 of FIG. 3A. The capacitance values may represent the difference between the count value determined by each sensor and a baseline value when no conductive object is present. The horizontal axis of the chart 320 corresponds to the sensor element number, e.g., sensor 1 to sensor N, of the slider 310. The height of the columns on the vertical axis represents the measured difference counts for each of the sensor elements with the presence of fingers A and B on the slider as illustrated in FIG. 3A.

Figure 4:
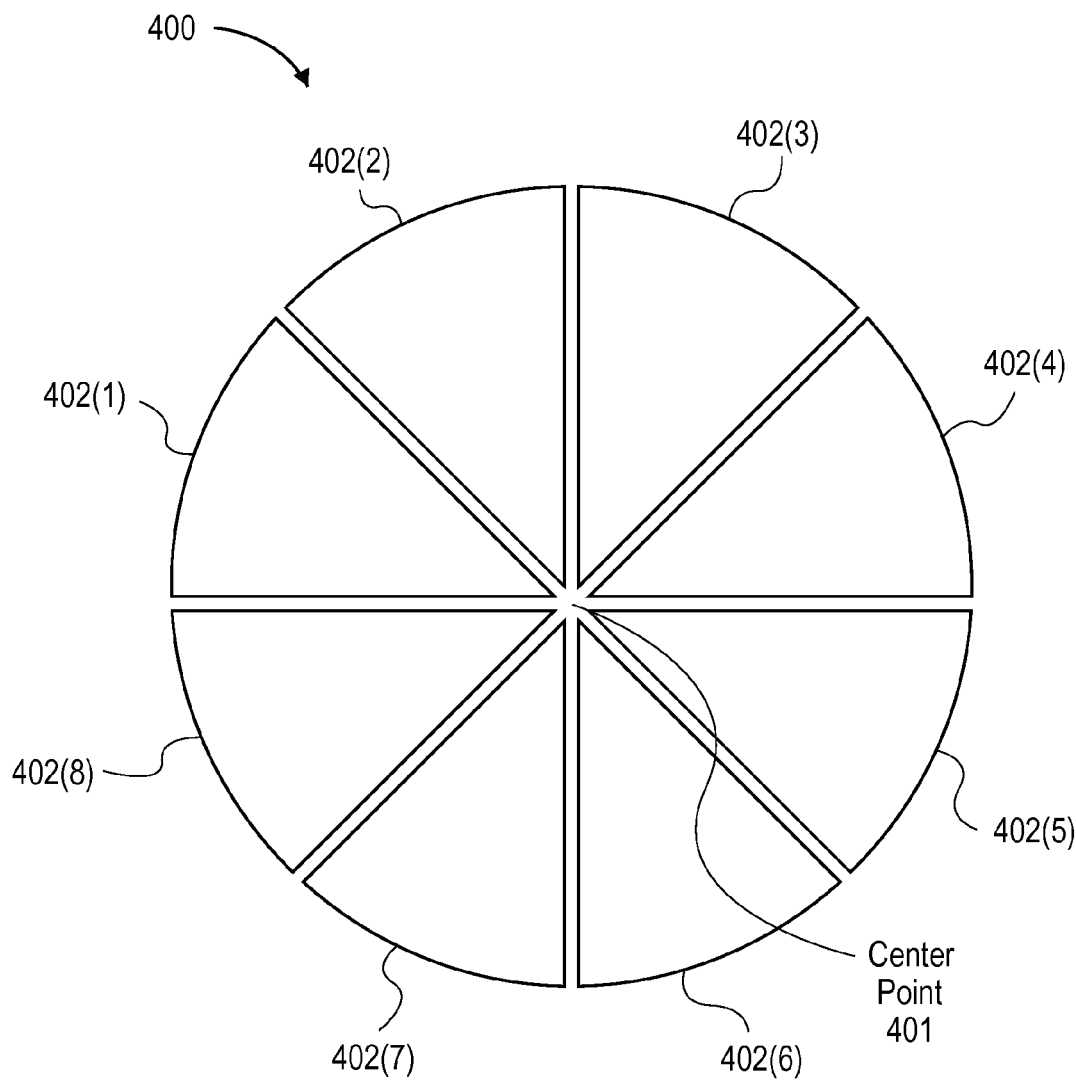
FIG. 4 illustrates a circular slider according an embodiment.

In alternative embodiments, the method discussed herein may also be utilized with a circular, or radial, slider. Circular sliders are also known as closed-cycle sliders because the first sensor element of a group of sensor elements is disposed to be adjacent to the last sensor element of the group, which in effect closes the group of sensor elements into a circle. In one embodiment, the sensor elements of the linear slider of FIG. 3A may be wrapped around to join each other forming a circular slider. In another embodiment, a circular slider configuration of sensor elements as illustrated in FIG. 4 may be used. Circular slider 400 includes n sensor elements. Although the illustrated circular slider includes eight sensor elements 402(1)-402(8), disposed non-linearly in a substantially circular shape, other numbers of sensor elements may be used. In one embodiment, the sensor elements 402(1)-402(8) have a pie-shape with the smaller side of the pie-shape towards the center point 401. In other words, each sensor element has a curved edge, which represents the outer edge of the circular shape of the sensing device 400, and two substantially straight edges, which represent the boundary to the adjacent sensor elements. The width of the pie-shaped sensor element may gradually decrease from the curved edge to the center point 401. In alternative embodiments, the circular slider may also include a center sensor element and may have other configurations. Circular sliders are known in the art; accordingly, further details are not provided.

Figure 5:
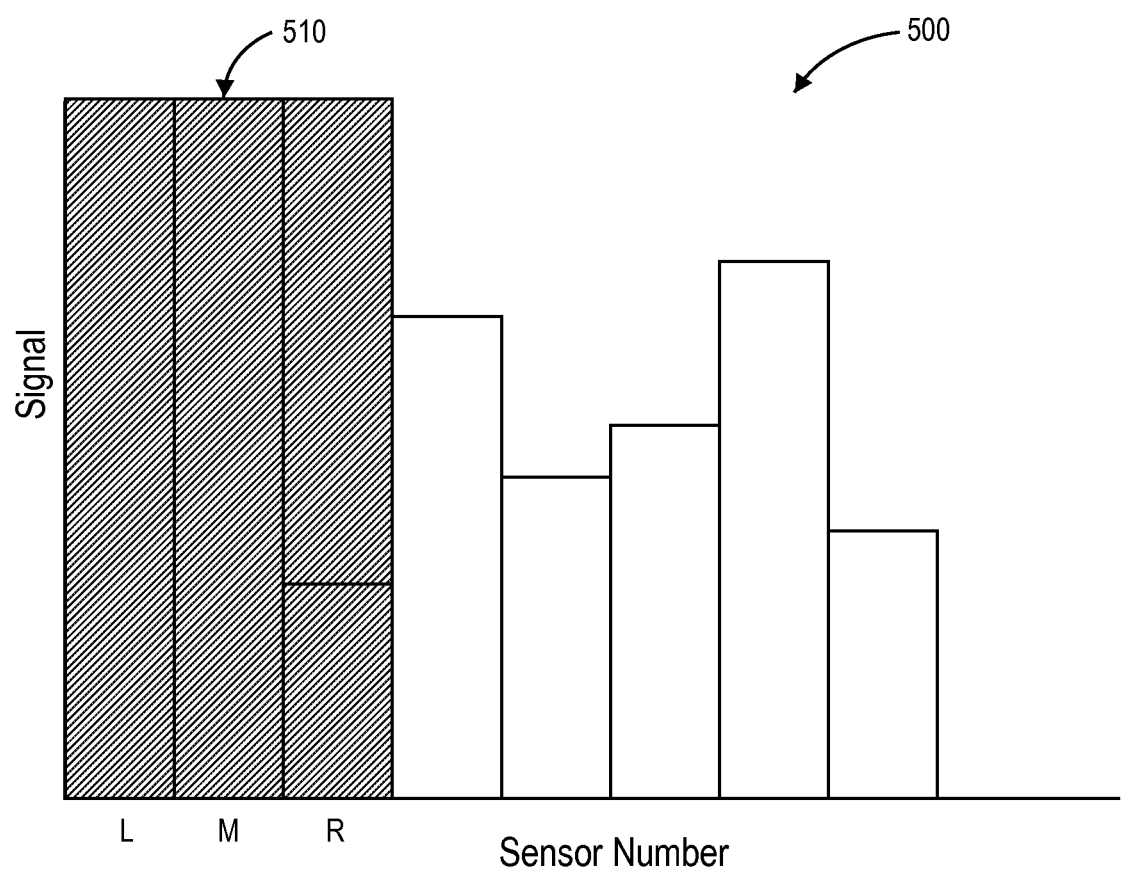
FIG. 5 illustrates a sensor window that examines the count values for a certain number of sensor elements to determine whether a conductive object is present according to an embodiment.

FIG. 5 illustrates a sensor window that examines the count values for a certain number of sensor elements to determine whether a conductive object is present. The chart 500 illustrates the capacitance values sensed by sensor elements (e.g., 355(1)-355(N)) of a slider (e.g., slider 310 of FIG. 3A). In one embodiment, the sensor window 510 examines three of the sensor elements at a time, however, in alternative embodiments, the sensor window examines two or more sensor elements. In this embodiment, the sensor window examines three sensors (labeled left, middle and right, for ease of explanation). The count values for the sensor elements currently being examined in sensor window 510 are read and processed according to an algorithm by processing device 210 to determine if a conductive object is present. Each time a conductive object is determined to be present, a counter is incremented so that the system can determine how many conductive objects (e.g., fingers) are present on the slider at a given time. Sensor window 510 logically represents a set of sensor elements that are currently being examined. Shifting sensor window 510 includes changing the set of elements that make up the set in the sensor window.

Figure 6:
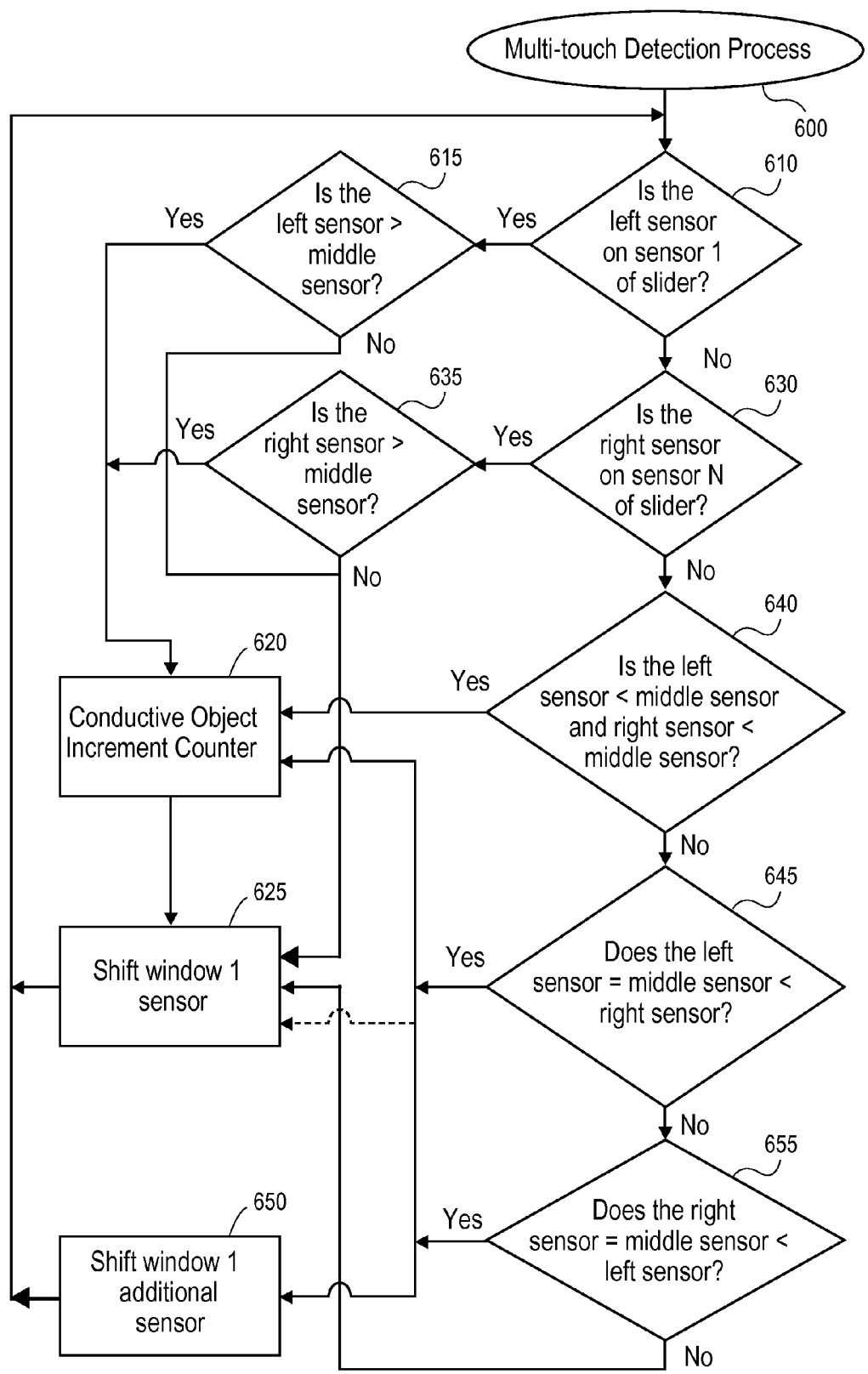
FIG. 6 is a flow diagram illustrating an algorithm used to determine whether a conductive object is present on a touch sensor slider according to an embodiment.

FIG. 6 is a flow diagram illustrating an algorithm used to determine if a conductive object is present on the touch sensor slider according to one embodiment. The process 600 may be performed by processing logic that comprises hardware (e.g., circuitry, dedicated logic, programmable logic, microcode, etc.), software (e.g., instructions run on a processing device to perform hardware simulation), or a combination thereof. FIGS. 7A-7H illustrate a sensor window as it shifts through a number of sensor elements to determine whether a conductive object is present according to one embodiment. The charts in FIGS. 7A-7H illustrate the capacitance values sensed by sensor elements (e.g., 355(1)-355(N)) of a slider (e.g., slider 310 of FIG. 3A). In this embodiment the slider has ten sensor elements, meaning that there are eight possibly locations for the sensor window. In this embodiment, in each of FIGS. 7A-7H, the sensor window includes three sensors is shifted one sensor to the right along the slider. In alternative embodiments, the sensor window may have two or more sensors and may be shifted along the slider in another direction.

Referring to FIG. 6, in one embodiment, process 600 is performed by processing device 210 of FIG. 2A. In this embodiment, at block 610, process 600 determines if the left sensor of sensor window 510 is currently examining the first (corner) sensor of the slider. In a linear slider, the first corner sensor may be a sensor that has only one adjacent sensor. This situation is illustrated in FIG. 7A. Sensor window 510 currently includes sensors 1, 2 and 3 of the linear slider. If the condition at block 610 is met, process 600 proceeds to block 615. At block 615, process 600 determines if the count value of the left sensor of sensor window 510 is greater than the count value of the middle sensor. If YES, it is determined that a conductive object is present at block 620. FIG. 7A illustrates the case where the left sensor (sensor 1) has a count value greater than the middle sensor (sensor 2). In this case, the conductive object (e.g., a finger) may be partially off the left side of the touch sensor slider. A counter, such as counter 214, is incremented at block 620 and process 600 continues to block 625. At block 625, process 600 shifts sensor window 510 one sensor to the right (as shown in FIG. 7B). Process 600 then returns to block 610. If at block 615, the condition is not met, process 600 proceeds directly to block 625.

If at block 610, the condition is not met, process 600 proceeds to block 630. At block 630, process 600 determines if the right sensor of sensor window 510 is currently examining the last (corner) sensor (e.g., sensor N) of the slider. This situation is illustrated in FIG. 7H. If YES, process 600 proceeds to block 635. At block 635, process 600 determines if the count value of the right sensor of sensor window 510 is greater than the count value of the middle sensor. If YES, it is determined that a conductive object is present at block 620. In this case, the conductive object may be partially off the right side of the touch sensor slider. A counter, such as counter 214, is incremented at block 620 and process 600 continues to block 625. If at block 635, the condition is not met, process 600 proceeds directly to block 625. In FIG. 7H, the right sensor (sensor 10) is not greater than the middle sensor (sensor 9), so the condition is not met.

If at block 630, the condition is not met, process 600 proceeds to block 640. At block 640, process 600 determines if the count value of the left sensor of sensor window 510 is less than the count value of the middle sensor and if the count value of the right sensor is less than the count value of the middle sensor. If YES, it is determined that a conductive object is present at block 620. FIG. 7C illustrates the case where the middle sensor (sensor 4) has a count value that is greater than both the left sensor (sensor 3) and the right sensor (sensor 5). A counter such as counter 214 is incremented at block 620 and process 600 continues to block 625.

If at block 640, the condition is not met, process 600 proceeds to block 645. At block 645, process 600 determines if the count value of the left sensor of sensor window 510 equals the count value of the middle sensor (where the left and middle sensors have a count value greater than the baseline value) and if the count value of the right sensor is greater than the count value of the middle sensor and left sensor. If YES, it is determined that a conductive object is present at block 620. FIG. 7E illustrates the case where the left and middle sensors (sensors 5 and 6) are equal and the right sensor (sensor 7) is greater than both the left and middle sensors. A counter, such as counter 214, is incremented at block 620 and process 600 continues to block 625. In this case, the equal count values on two sensors preceding a peak may indicate that two separate conductive objects are present on the touch sensor slider. One conductive object generally cannot create equal count values on two adjacent sensors and a higher count value on the third. Thus, a conductive object is detected if the condition is met. Because it is likely that another conductive object will be detected if the sensor window is shifted over one sensor (even though the peak is attributable to the same conductive object), the sensor window is shifted over another sensor at block 650, for a total of two sensors, so that the sensor window includes a group of adjacent sensor elements that shares only one sensor element with the previous group. Thus, the sensor window is shifted from its position in FIG. 7E, skipping the position in FIG. 7F, to the position in FIG. 7G. This prevents a second presence detection from the same conductive object. Process 600 then returns to block 610. In an alternative embodiment, if the condition is met at block 645, process 600 proceeds directly to block 625 and shifts the sensor window without counting the presence of a conductive object.

If at block 645, the condition is not met (i.e., NO), process 600 proceeds to block 655. At block 655, process 600 determines if the count value of the right sensor of sensor window 510 equals the count value of the middle sensor (where the middle and right sensors have a count value greater than the baseline value) and if the count value of the left sensor is greater than the count value of the middle sensor and right sensor. If, YES, it is determined that a conductive object is present at block 620. FIG. 7D illustrates the case where the middle and rights sensors (sensors 5 and 6) are equal and the left sensor (sensor 4) is greater than both the right and middle. A counter, such as counter 214, is incremented at block 620 and process 600 continues to block 625. In this case, the equal count values on two sensors following a peak may indicate that two separate conductive objects are present on the touch sensor slider. In order to prevent a second presence detection from the same conductive object, the sensor window is shifted over one additional sensor at block 650, so that the sensor window includes a group of adjacent sensor elements that shares only one sensor element with the previous group. Process 600 then returns to block 610. In an alternative embodiment, if the condition is met at block 655, process 600 proceeds directly to block 625 and shifts the sensor window without counting the presence of a conductive object.

In another embodiment, the number of conductive objects present on a slider may be determined by counting a number of rising slopes of sensor element count values. A rising slope occurs when one sensor element has a count value greater than an adjacent sensor element. In this embodiment, the sensor elements are examined using a sliding sensor window, similar to sensor window 510, including two or more sensors. The sensor window may be shifted along the slider in either direction.

Figure 8:
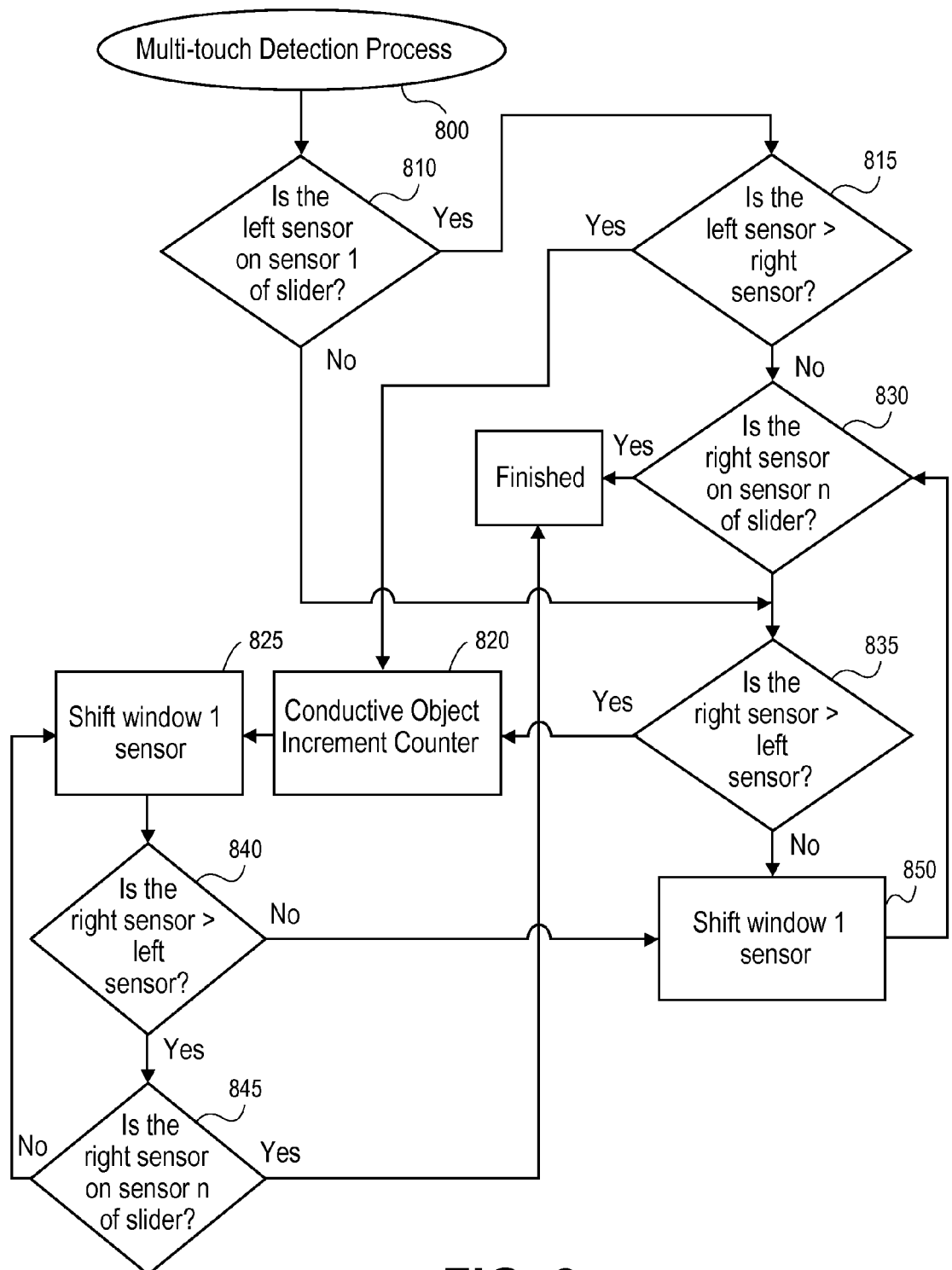
FIG. 8 is a flow diagram illustrating an algorithm used to determine whether a conductive object is present on a touch sensor slider according to an embodiment.

FIG. 8 is a flow diagram illustrating an algorithm used to determine if a conductive object is present on the touch sensor slider according to one embodiment. The process 800 may be performed by processing logic that comprises hardware (e.g., circuitry, dedicated logic, programmable logic, microcode, etc.), software (e.g., instructions run on a processing device to perform hardware simulation), or a combination thereof. FIGS. 9A-9F illustrate a sensor window as it shifts through a number of sensor elements to determine whether a conductive object is present according to an embodiment. The charts in FIGS. 9A-9F illustrates the capacitance values sensed by sensor elements (e.g., 355(1)-355(N)) of a slider (e.g., slider 310 of FIG. 3A). In this embodiment a sensor window covering two sensors is shifted from left to right across the slider and detects the presence of a rising slope attributable to the presence of a conductive object.

Figure 9A:
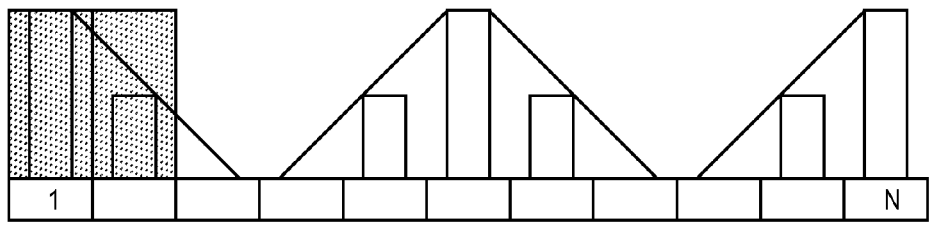
FIGS. 9A-9F illustrate a sensor window as it shifts through a number of sensor elements to determine whether a conductive object is present according an embodiment.
Figure 9B:
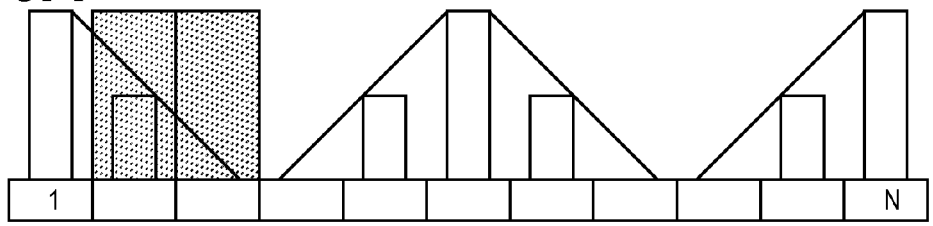
Figure 9C:
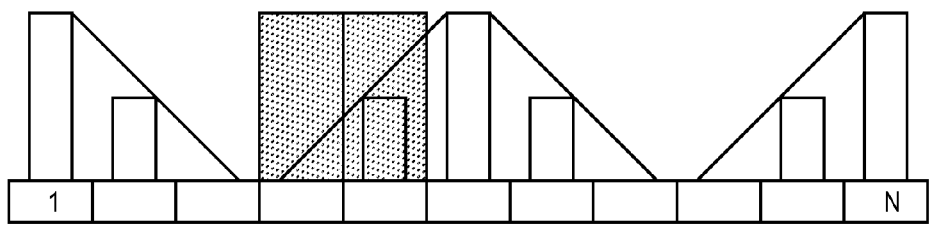

Referring to FIG. 8, in one embodiment, process 800 is performed by processing device 210 of FIG. 2A. In one embodiment, at block 810, process 800 determines if the left sensor of the sensor window is currently examining the first (corner) sensor of the slider. In a linear slider, the first corner sensor may be a sensor that has only one adjacent sensor. For example, in FIG. 9A the sensor window is examining sensors 1 and 2 of the slider, where sensor 1 is a corner sensor. If the condition at block 810 is met, process 800 proceeds to block 815. At block 815, process 800 determines if the count value of the left sensor of the sensor window is greater than the count value of the right sensor. If YES, it is determined that a conductive object is present at block 820. In this case, the conductive object (e.g., a finger) may be partially off the left side of the touch sensor slider. FIG. 9A illustrates a case where the count value of the left sensor is greater than the count value of the right sensor of the sensor window. A counter, such as counter 214, is incremented at block 820 and process 800 continues to block 825. At block 825, process 800 shifts the sensor window one sensor to the right (as shown in FIG. 9B). If at block 815, the condition is not met, process 800 proceeds to block 830.

Figure 9D:
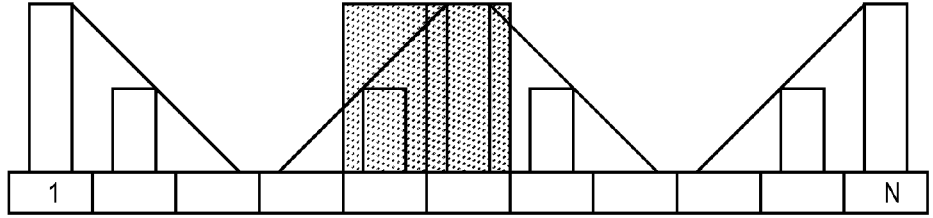
Figure 9E:
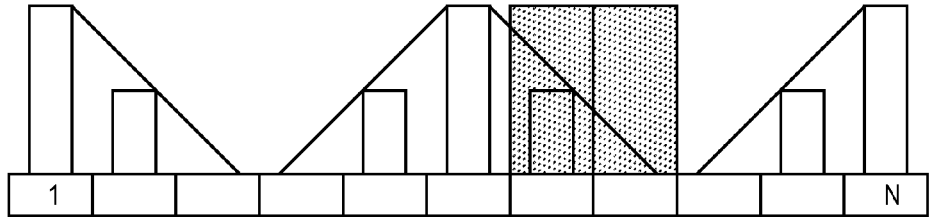
Figure 9F:
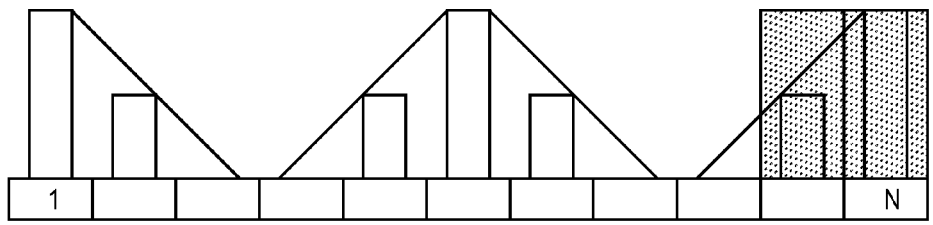

At block 830, process 800 determines if the right sensor of the sensor window is currently examining the last (corner) sensor (e.g., sensor N) of the slider. This case is illustrated in FIG. 9F. If so, process 800 finishes. If at block 830, the condition is not met, process 800 proceeds to block 835. Similarly, if at block 810, the condition is not met, process 800 also proceeds to block 835.

At block 835, process 800 determines if the right sensor of the sensor slider has a count value that is greater than the left sensor of the sensor slider. If YES, it is determined that a conductive object is present at block 820. For example, in FIG. 9C, the right sensor of the slider (sensor 5) has a count value that is greater than the left sensor (sensor 4). A counter such as counter 214 is incremented at block 820 and process 800 continues to block 825, where process 800 shifts the sensor window one sensor to the right (as shown in FIG. 9D).

At block 840, process 800 determines if the count value of the right sensor of the sensor window is greater than the count value of the left sensor. If, YES, process 800 proceeds to block 845. At block 845, process 800 determines if the right sensor of the sensor window is currently examining the last (corner) sensor (e.g., sensor N) of the slider. If YES, process 800 finishes. If at block 845, the condition is not met, process 800 returns to block 825. In FIG. 9D, the condition of block 840 is met (sensor 6 is greater than sensor 5), but the condition of block 845 is not, so the sensor window is shifted one sensor to the right without incrementing the counter (as shown in FIG. 9E).

If at block 840, the condition is not met, process 800 proceeds to block 850. At block 850, process 800 shifts the sensor window one sensor to the right. Process 800 then returns to block 830.

Multi-touch detection processes 600 and 800 allow a processing device to determine a number of conductive objects present on a touch sensor device. In certain embodiments, a processing device may determine the location of those touches according the method described above with respect to FIG. 2B.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
  scanning a touch sensor array to generate sensor element signals corresponding to each of a plurality of sensor elements of the touch sensor array;
  using sensor element signals corresponding to a plurality of sensor elements associated with a shifting sensor window to:
    compare two or more sensor element signals corresponding to a first group of sensor elements associated with a first position of the sensor window; and
    compare two or more sensor element signals corresponding to a second group of sensor elements associated with a second position of the sensor window, the second group being different from the first group and comprising at least one sensor element of the first group; and
  determining, by a processing device, a presence of at least one conductive object based on the comparisons.

2. The method of claim 1, wherein using the sensor element signals corresponding to the sensor elements associated with the shifting sensor window comprises determining existences of two or more sensor element signal peaks of the sensor element signals.

3. The method of claim 1, wherein using the sensor element signals corresponding to sensor elements associated with the shifting sensor window comprises:
  determining, by the processing device, an existence of a first sensor element signal peak on the touch sensor array using the sensor element signals corresponding to the first group; and
  determining, by the processing device, an existence of a second sensor element signal peak on the touch sensor array using the sensor element signals corresponding to the second group.

4. The method of claim 1, wherein determining a presence of at least one conductive object comprises:
  comparing a sensor element signal corresponding to a middle sensor of the sensor window to sensor element signals corresponding to a left sensor of the sensor window and a right sensor of the sensor window; and
  when the sensor element signal corresponding to the middle sensor is greater than the sensor element signals corresponding to the left sensor and the right sensor, determining that at least one conductive object is present.

5. The method of claim 1, wherein determining a presence of at least one conductive object comprises:
  determining that a left sensor of the sensor window corresponds to a corner sensor element of the sensor array;
  comparing a sensor element signal corresponding to the corner sensor element to a sensor element signal corresponding to a sensor element adjacent to the corner sensor element; and
  when the sensor element signal corresponding to the corner sensor element is greater than the sensor element signal corresponding to the sensor element adjacent to the corner sensor element, determining that at least one conductive object is present.

6. The method of claim 1, wherein determining a presence of at least one conductive object comprises:
  determining that a right sensor of the sensor window corresponds to a corner sensor element of the sensor array;
  comparing a sensor element signal corresponding to the corner sensor element to a sensor element signal corresponding to a sensor element adjacent to the corner sensor element; and
  when the sensor element signal corresponding to the corner sensor element is greater that the sensor element signal corresponding to the sensor element adjacent to the corner sensor element, determining that at least one conductive object is present.

7. The method of claim 1, wherein determining a presence of at least one conductive object comprises:
  determining that a left sensor of the sensor window has a corresponding non-zero sensor element signal equal to a sensor element signal corresponding to a middle sensor of the sensor window;
  comparing a sensor element signal corresponding to a right sensor of the sensor window to the sensor element signals corresponding to the left and middle sensors; and
  when the sensor element signal corresponding to the right sensor is greater than the sensor element signals corresponding to the left and middle sensors, determining that at least one conductive object is present.

8. The method of claim 7, wherein the first group and the second group share only one sensor element.

9. The method of claim 1, wherein determining a presence of at least one conductive object comprises:
determining that a right sensor of the sensor window has a corresponding non-zero sensor element signal equal to a sensor element signal corresponding to a middle sensor of the sensor window;
comparing a sensor element signal corresponding to a left sensor of the sensor window to the sensor element signals corresponding to the right and middle sensors; and
when the sensor element signal corresponding to the left sensor is greater than the sensor element signals corresponding to the right and middle sensors, determining that at least one conductive object is present.

10. The method of claim 9, wherein the first group and the second group share only one sensor element.

11. The method of claim 1, wherein using the sensor element signals corresponding to sensor elements associated with the shifting sensor window comprises determining existences of two or more rising slopes of the sensor element signals.

12. The method of claim 1, wherein using the sensor element signals corresponding to sensor elements associated with a shifting sensor window comprises:
determining, by the processing device, an existence of a first rising slope on the touch sensor array using the sensor element signals corresponding to the first group; and
determining, by the processing device, an existence of a second rising slope on the touch sensor array using the sensor element signals corresponding to the second group.

13. The method of claim 1, wherein determining a presence of at least one conductive object comprises:
comparing a sensor element signal corresponding to a right sensor of the sensor window to a sensor element signal corresponding to a left sensor of the sensor window; and
when the sensor element signal corresponding to the right sensor is greater than the sensor element signal corresponding to the left sensor, determining that at least one conductive object is present.

14. The method of claim 13, further comprising:
shifting the sensor window to include a third group of sensor elements until a sensor element signal corresponding to a right sensor of the shifted sensor window is no longer greater than a sensor element signal corresponding to a left sensor of the shifted sensor window.

15. The method of claim 1, further comprising:
calculating at least one centroid location corresponding to the at least one conductive object.

16. An apparatus, comprising:
a touch sensor array having a plurality of sensor elements; and
a processing device configured to:
scan the touch sensor array to generate sensor element signals corresponding to each of a plurality of sensor elements of the touch sensor array;
use sensor element signals corresponding to sensor elements associated with a shifting sensor window to:
compare two or more sensor element signals corresponding to a first group of sensor elements associated with a first position of the sensor window; and
compare two or more sensor element signals corresponding to a second group of sensor elements associated with a second position of the sensor window, the second group being different from the first group and comprising at least one sensor element of the first group; and
determine a presence of at least one conductive object based on the comparisons.

17. The apparatus of claim 16, wherein using the sensor element signals corresponding to the sensor elements associated with the shifting sensor window comprises determining existences of two or more sensor element signal peaks of the sensor element signals.

18. The apparatus of claim 16, wherein using the sensor element signals corresponding to the sensor elements associated with the shifting sensor window comprises:
determining an existence of a first sensor element signal peak on the touch sensor array using sensor element signals corresponding to the first group; and
determining an existence of a second sensor element signal peak on the touch sensor array using sensor element signals corresponding to the second group.

19. The apparatus of claim 16, wherein using the sensor element signals corresponding to the sensor elements associated with a shifting sensor window comprises determining existences of two or more rising slopes of the sensor element signals.

20. The apparatus of claim 16, wherein using the sensor element signals corresponding to the sensor elements associated with the shifting sensor window comprises:
determining an existence of a first rising slope on the touch sensor array using the sensor element signals corresponding to the first group; and
determining an existence of a second rising slope on the touch sensor array using the sensor element signals corresponding to the second group.

21. An apparatus, comprising:
a touch sensor array having a plurality of sensor elements; and
means for scanning the touch sensor array to generate sensor element signals corresponding to each of the plurality of sensor elements;
means for using sensor element signals corresponding to sensor elements associated with a shifting sensor window to:
compare two or more sensor element signals corresponding to a first group of sensor elements associated with a first position of the sensor window; and
compare two or more sensor element signals corresponding to a second group of sensor elements associated with a second position of the sensor window, the second group being different from the first group and comprising at least one sensor element of the first group; and
means for determining a presence of at least one conductive object based on the comparisons.

* * * * *